(12) United States Patent
Kringstad

(10) Patent No.: US 9,668,423 B2
(45) Date of Patent: Jun. 6, 2017

(54) CROP CART UNLOADING SYSTEM

(71) Applicant: Burnell R. Kringstad, Hoople, ND (US)

(72) Inventor: Burnell R. Kringstad, Hoople, ND (US)

( * ) Notice: Subject to any disclaimer, the term of this patent is extended or adjusted under 35 U.S.C. 154(b) by 113 days.

(21) Appl. No.: 14/735,611

(22) Filed: Jun. 10, 2015

(65) Prior Publication Data

US 2016/0360704 A1 Dec. 15, 2016

(51) Int. Cl.
*A01D 90/10* (2006.01)
*B60P 1/38* (2006.01)
*B65G 67/24* (2006.01)

(52) U.S. Cl.
CPC .............. *A01D 90/10* (2013.01); *B60P 1/38* (2013.01); *B65G 67/24* (2013.01)

(58) Field of Classification Search
CPC .................................. A01D 90/10; B60P 1/38
USPC .................................................. 414/505, 345
See application file for complete search history.

(56) References Cited

U.S. PATENT DOCUMENTS

| | | | | |
|---|---|---|---|---|
| 2,419,824 A * | 4/1947 | Davis | ........................ | B60P 1/36 198/318 |
| 2,655,274 A | 10/1953 | Lowe | | |
| 3,037,780 A * | 6/1962 | Skromme | .............. | A01D 90/10 414/502 |
| 3,047,173 A * | 7/1962 | Raney | .................... | A01D 90/10 414/502 |
| 3,189,202 A * | 6/1965 | Hansen | .................. | A01D 90/10 414/502 |
| 3,629,890 A | 12/1971 | Harris | | |
| 4,494,904 A * | 1/1985 | Hill | ........................ | A01D 90/00 414/491 |
| 5,013,207 A * | 5/1991 | Baker | .................... | A01D 90/00 414/505 |

(Continued)

FOREIGN PATENT DOCUMENTS

DE 102008053325 A1 * 4/2010 ............. A01D 90/10
DE 102009035038 A1 * 4/2010 ............. A01D 90/10

(Continued)

OTHER PUBLICATIONS http://www.spudnik.us/products/4835.php; The New Crop Cart from Spudnik; Received and Printed May 6, 2015.

(Continued)

*Primary Examiner* — James Keenan
(74) *Attorney, Agent, or Firm* — Neustel Law Offices

(57) ABSTRACT

A crop cart unloading system for efficiently unloading a harvested crop from a crop cart. The crop cart unloading system generally includes a hopper having a floor conveyor movably positioned with respect to a lower floor, a plurality of sidewalls extending upwardly from the lower floor, an unloading door movably connected to an unloading end of the hopper, and an upper opening defined by an upper edge of the plurality of sidewalls for receiving a field crop. The hopper is pivotally connected to a support frame having a plurality of wheels. A first actuator is connected between the support frame and the hopper to lift the unloading end of the hopper. An unloading conveyor is attached to the unloading end of the hopper to receive and discharge a field crop from the hopper.

23 Claims, 17 Drawing Sheets

(56) References Cited

U.S. PATENT DOCUMENTS

| | | | | | |
|---|---|---|---|---|---|
| 5,364,221 | A | * | 11/1994 | Theurer | B61D 3/16 |
| | | | | | 414/505 |
| 7,540,700 | B2 | * | 6/2009 | Hook | A01D 90/10 |
| | | | | | 414/503 |
| 2016/0129823 | A1 | * | 5/2016 | Millsaps, II | B60P 1/36 |
| | | | | | 414/505 |
| 2016/0286727 | A1 | * | 10/2016 | Telkamp | A01D 90/10 |

FOREIGN PATENT DOCUMENTS

| | | | | |
|---|---|---|---|---|
| DE | 202013102388 U1 | * | 8/2013 | A01D 90/10 |
| WO | WO 2016/087860 A1 | * | 6/2016 | A01D 90/10 |

OTHER PUBLICATIONS http://www.hsrowcrop.com/archived/pdf/sugarbee2-lowres.pdf; Sugarbeet Cart from H&S Manufacturing; Received and Printed May 6, 2015.
http://hydraulicdumpcart.com/; High Dump Cart from HighDumpCart.com; Received and Printed May 6, 2015.
http://www.oxbocorp.com/Products/DumpCarts.aspx; Dump Carts from Oxbo International Corporation; Received and Printed May 6, 2015.

* cited by examiner

CROP CART UNLOADING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

Field of the Invention

The present invention relates generally to a crop cart and more specifically it relates to a crop cart unloading system for efficiently unloading a harvested crop from a crop cart.

Description of the Related Art

Any discussion of the related art throughout the specification should in no way be considered as an admission that such related art is widely known or forms part of common general knowledge in the field.

Crop carts are used to receive a crop from a harvester directly in the field during harvest. Crop carts can also be used to transport seed to a planter. Crop carts are typically used to receive, transport and unload various types of field crops such as, but not limited to, sugar beets, carrots, potatoes, onions, tomatoes, cucumbers, corn silage and the like. Conventional crop carts are comprised of a trailer that is pulled by a tractor through the field next to the harvester. Conventional crop carts include an open topped hopper that receives various volumes of harvested crop from the harvester in real-time. When the hopper of the crop shuttle is full, the crop cart is transported to a location in the field to unload to a truck or other transport device using an unloading conveyor at the front of the hopper. The hopper includes a floor conveyor that moves the crop forwardly towards the unloading conveyor where the unloading conveyor is angled upwardly to lift the crop upwardly from the crop shuttle into the transport vehicle.

One problem with conventional crop carts is that the unloading conveyor extends upwardly at a relatively steep angle thereby resulting in the crop falling downwardly on the unloading conveyor during the unloading procedure. When the crop falls downwardly on the unloading conveyor, crops such as sugar beets can become damaged. Another problem with conventional crop carts is that the front unloading conveyor extends upwardly above the upper edge of the container when in the storage position thereby creating potential problems of hitting the harvester during loading of the crop. Another problem with conventional crop carts is that they require a significant volume of pressurized hydraulic fluid from the tractor pulling the crop cart to unload the crop which some older tractors are unable to handle.

Because of the inherent problems with the related art, there is a need for a new and improved crop cart unloading system for efficiently unloading a harvested crop from a crop cart.

BRIEF SUMMARY OF THE INVENTION

The invention generally relates to a crop cart unloading system which includes a hopper having a floor conveyor movably positioned with respect to a lower floor, a plurality of sidewalls extending upwardly from the lower floor, an unloading door movably connected to an unloading end of the hopper, and an upper opening defined by an upper edge of the plurality of sidewalls for receiving a field crop. The hopper is pivotally connected to a support frame having a plurality of wheels, or tracks. A first actuator is connected between the support frame and the hopper to lift the unloading end of the hopper. An unloading conveyor is attached to the unloading end of the hopper to receive and discharge a field crop from the hopper.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
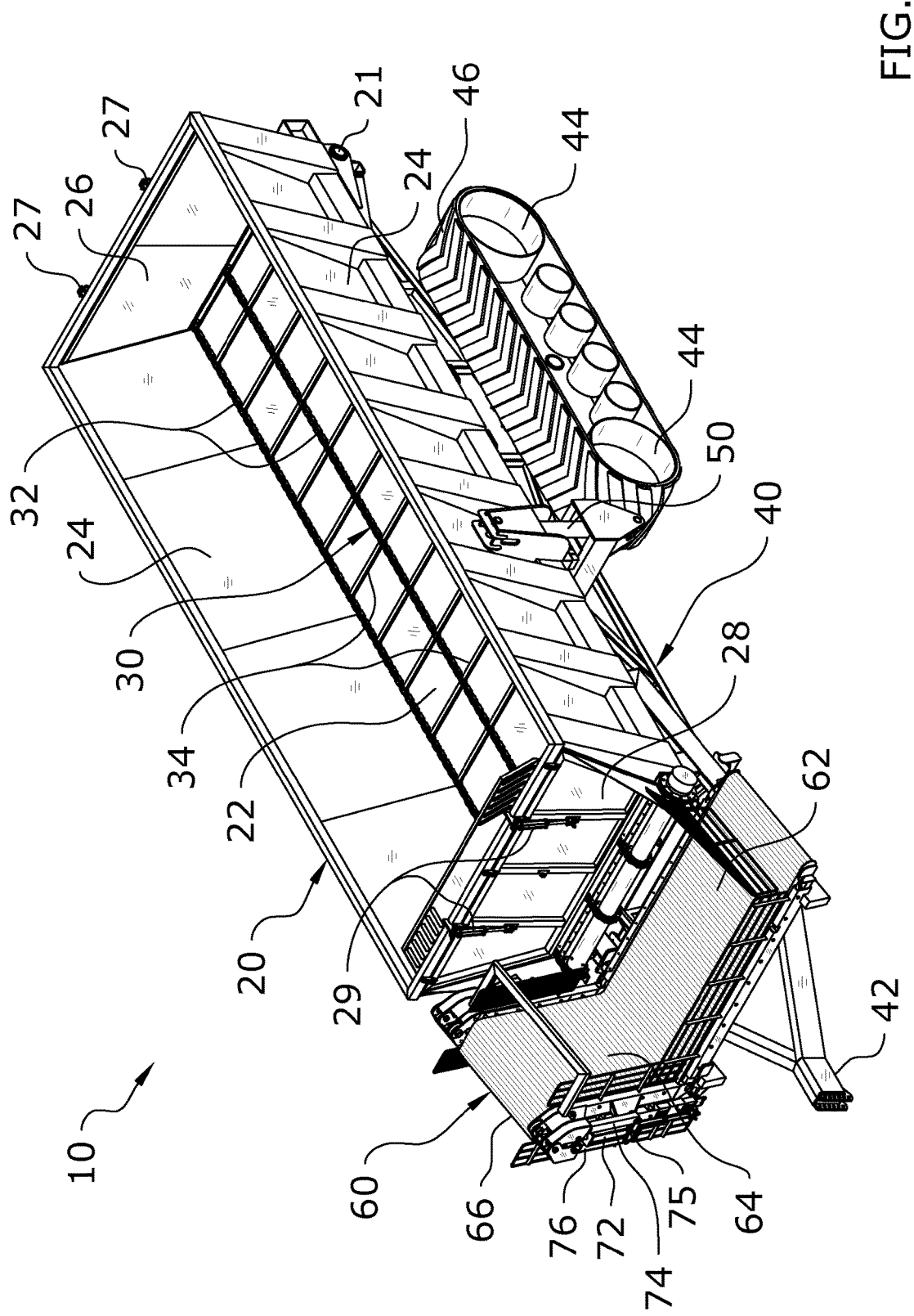
FIG. 1 is a front upper perspective view of the present invention in the loading position.

A. Overview.

Turning now descriptively to the drawings, in which similar reference characters denote similar elements throughout the several views, FIGS. 1 through 8c illustrate a crop cart unloading system 10, which comprises a hopper 20 having a floor conveyor 30 movably positioned with respect to a lower floor 22, a plurality of sidewalls 24 extending upwardly from the lower floor 22, an unloading door 28 movably connected to an unloading end of the hopper 20, and an upper opening defined by an upper edge of the plurality of sidewalls 24 for receiving a field crop 14. The hopper 20 is pivotally connected to a support frame 40 having a plurality of wheels 44 or track system. At least one actuator 50, 52 is connected between the support frame 40 and the hopper 20 to lift the unloading end of the hopper 20. An unloading conveyor 60 is attached to the unloading end of the hopper 20 to receive and discharge a field crop 14 from the hopper 20. The present invention is capable of being pulled behind a vehicle similar to a trailer or may have its own engine, as power assist or to operate as its own vehicle similar to a truck.

The present invention is designed for receiving, transporting and unloading various types of field crops 14 such as, but not limited to, sugar beets, carrots, potatoes, onions, tomatoes, cucumbers, corn silage and the like. The present invention may be utilized to receive, transport and unload various types of crop seed. The present invention may also be utilized for transporting and receiving non-field crops 14 such as lime.

B. Support Frame.

The support frame 40 having a front end, a rear end, a left side and a right side. The support frame 40 includes a longitudinal axis extending from the rear end to the front end of the support frame 40. The support frame 40 may have various shapes and structures capable of supporting the hopper 20.

The support frame 40 includes a plurality of wheels 44 rotatably attached to the sides of the support frame 40 for movably supporting the support frame 40 above a ground surface. A first track 46 preferably surrounds a plurality of wheels 44 on a first side of the support frame 40 and a second track 46 preferably surrounds a plurality of wheels 44 on a second side of the support frame 40 as illustrated in FIGS. 1 through 6 of the drawings.

Figure 2:
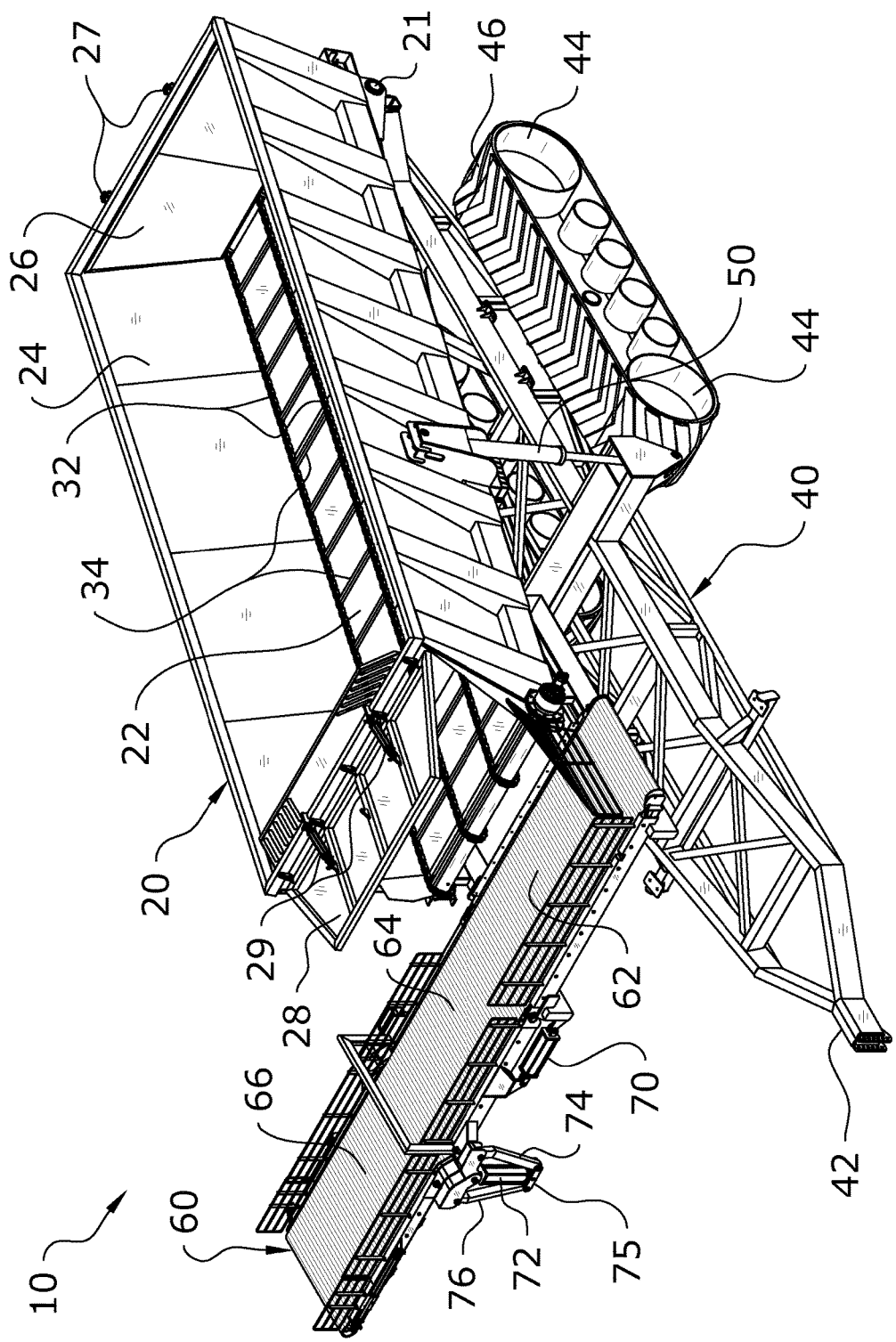
FIG. 2 is a front upper perspective view of the present invention in the unloading position.

The support frame 40 includes a hitch 42 adapted for removably connecting to a vehicle such as a tractor as illustrated in FIGS. 1 and 2 of the drawings. The support frame 40 may be comprised of any type of frame structure capable of supporting the hopper 20 in a movable manner in a field.

C. Hopper.

Figure 3:
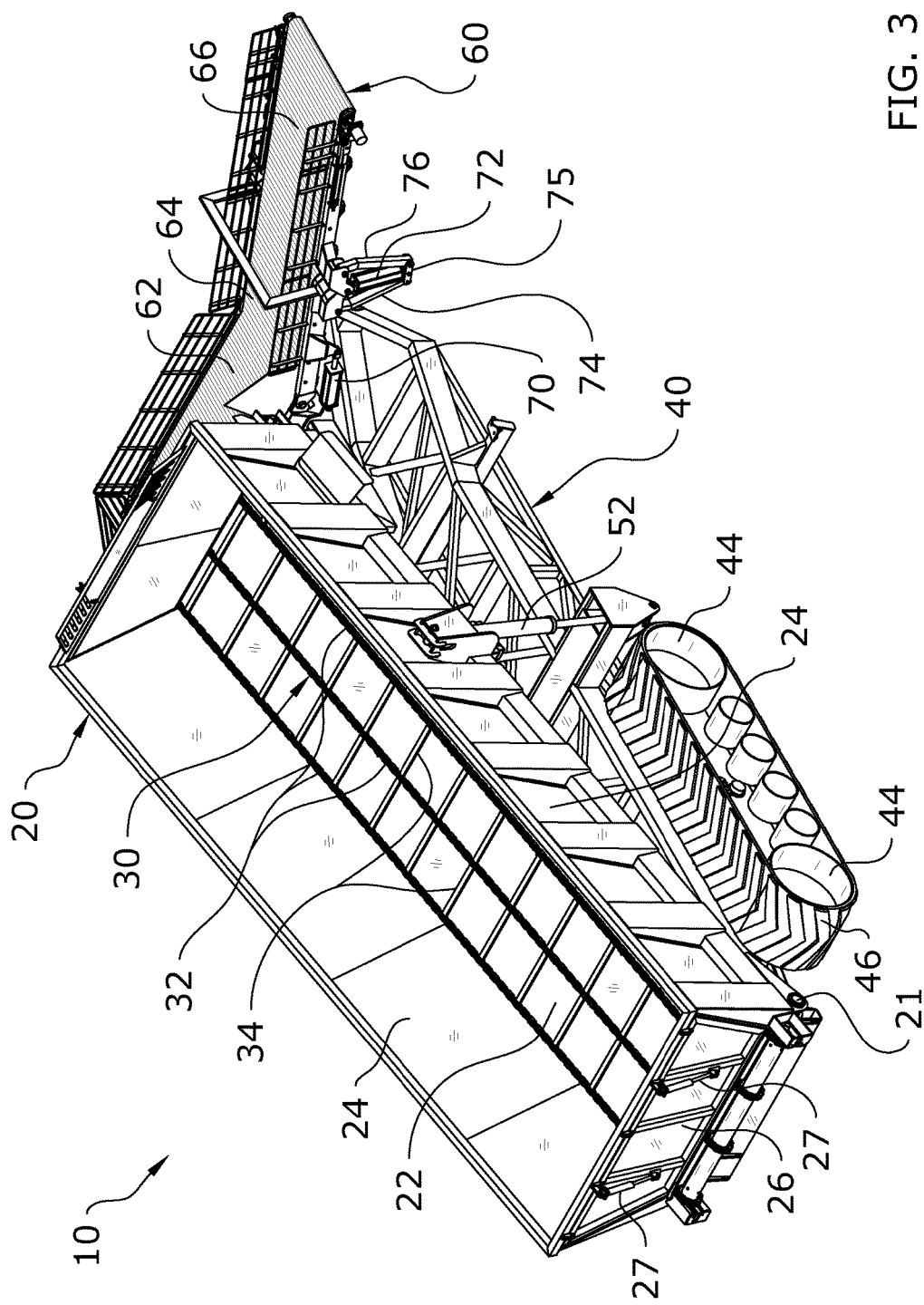
FIG. 3 is a rear upper perspective view of the present invention in the unloading position.
Figure 7A:
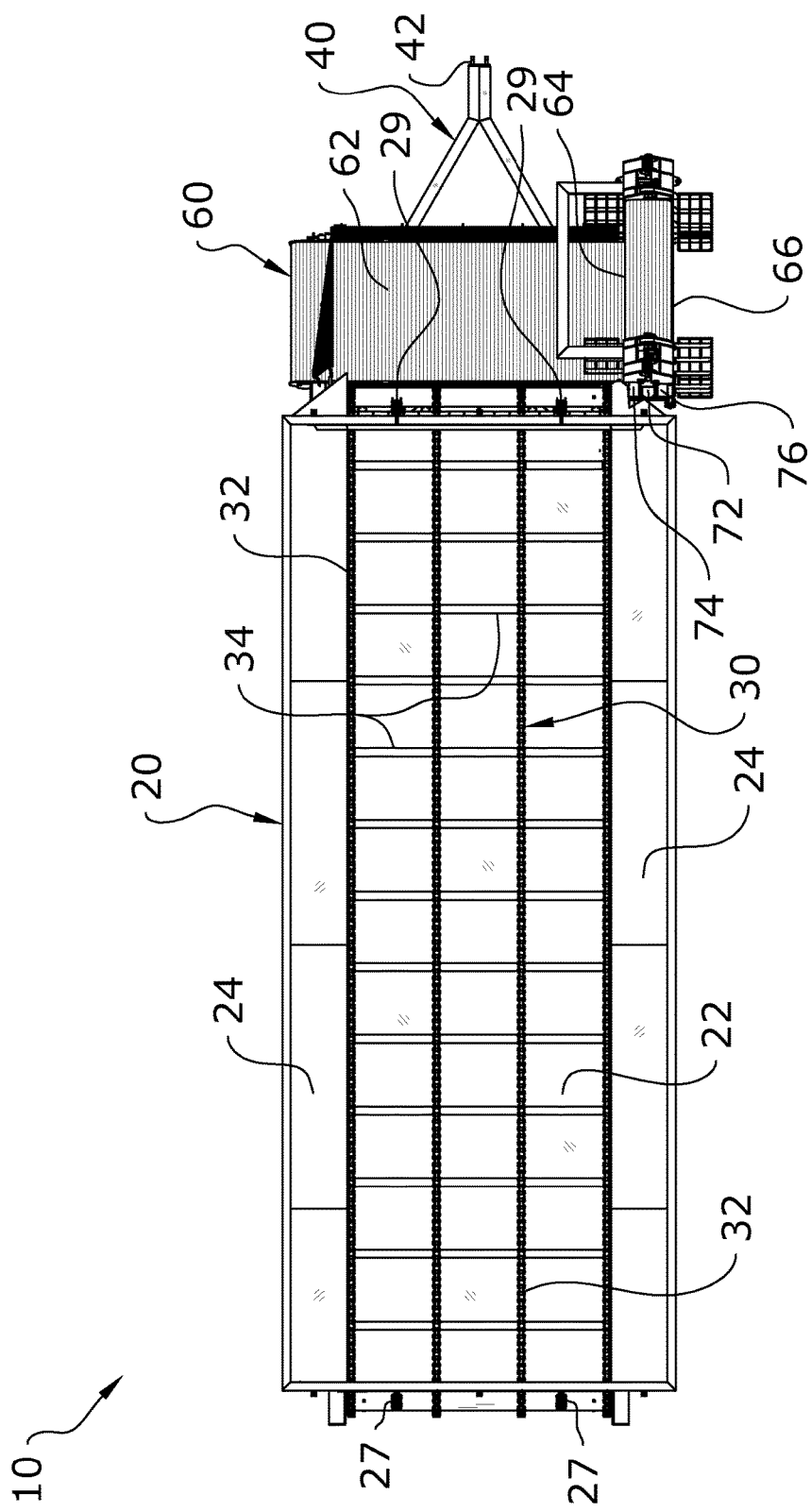
FIG. 7a is a top view of the present invention in the loading position.
Figure 7B:
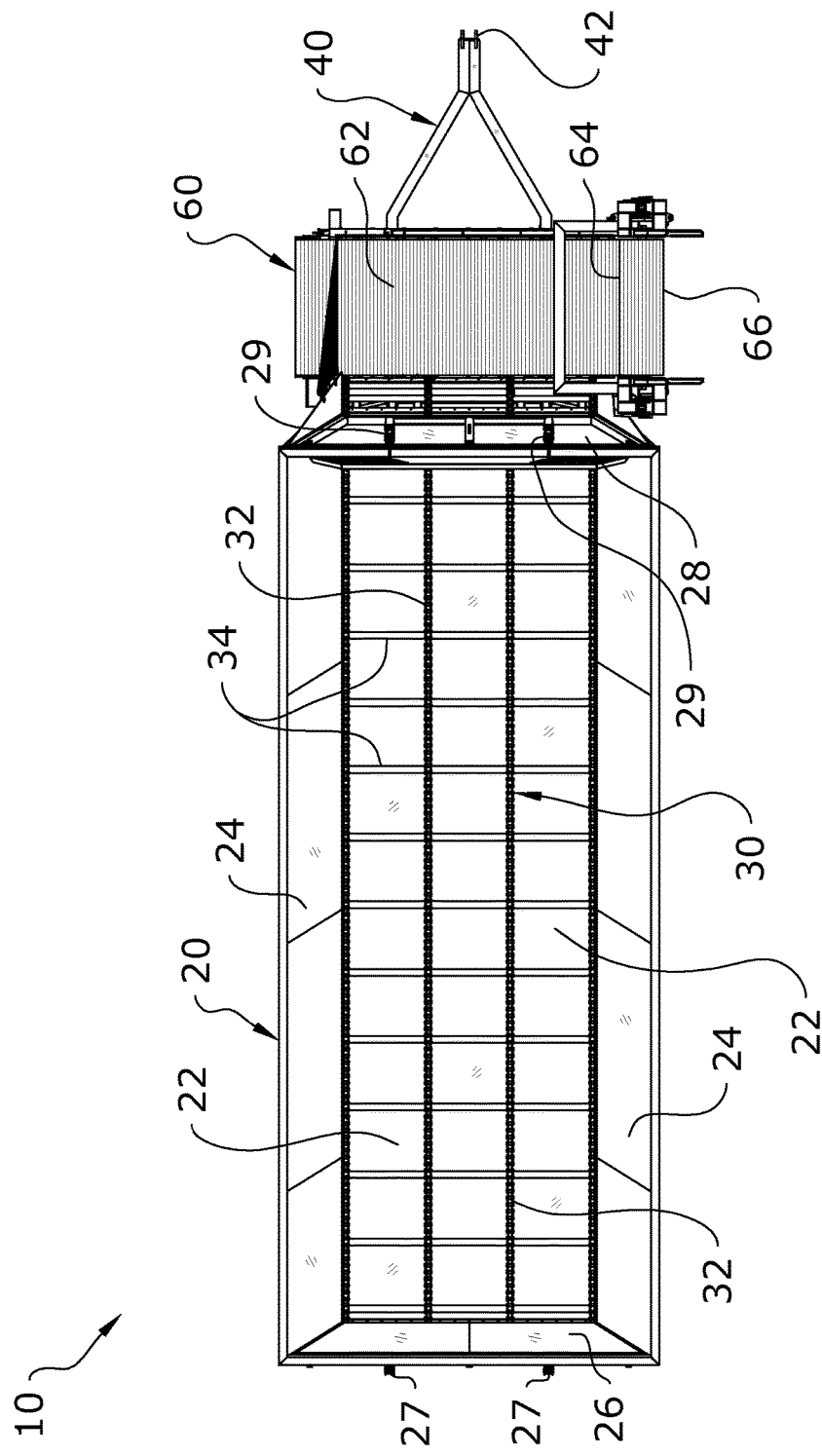
FIG. 7b is a top view of the present invention with the cart elevated for the loading position.
Figure 7C:
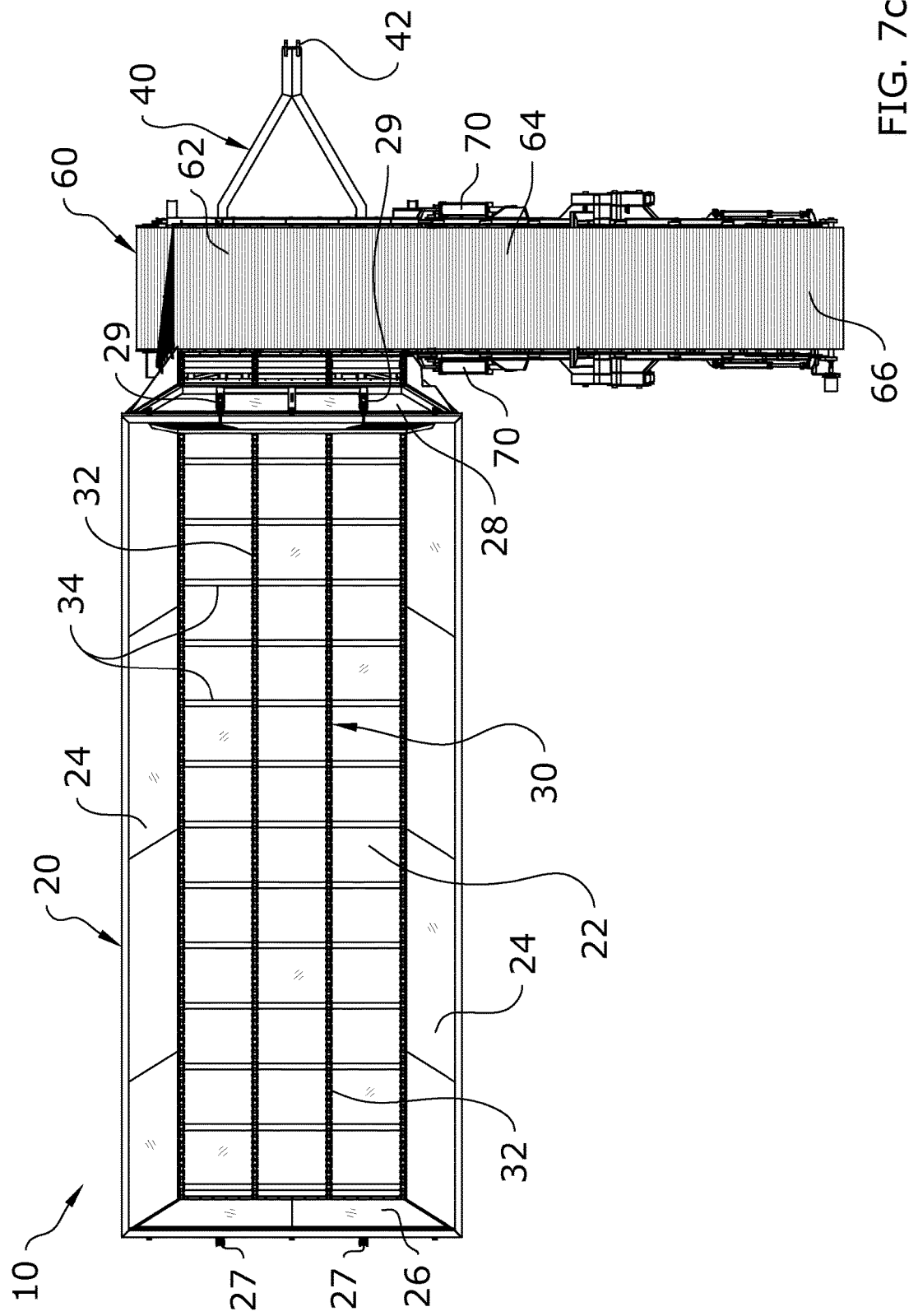
FIG. 7c is a top view of the present invention in the unloading position with the unloading conveyor extended.
Figure 7D:
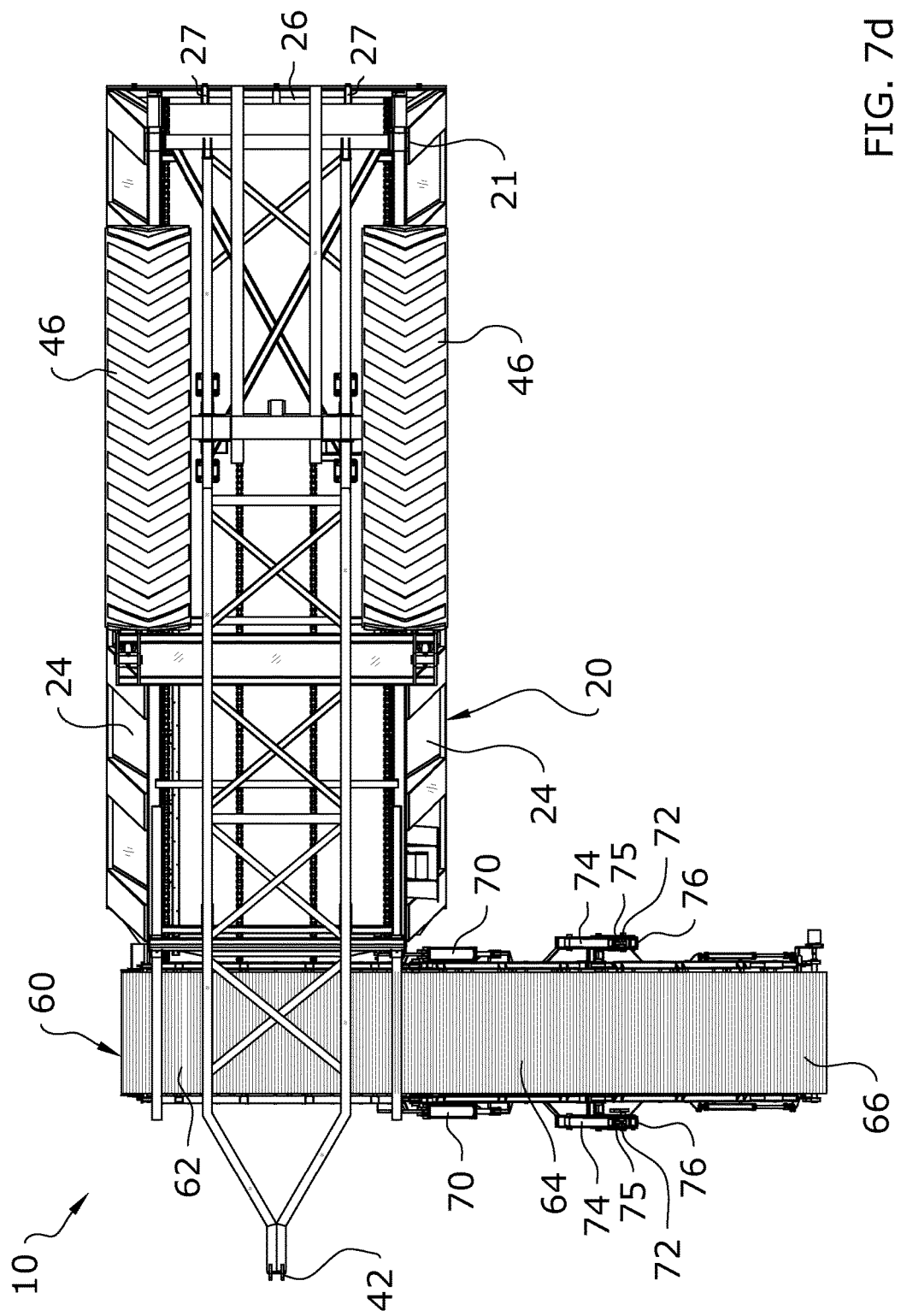
FIG. 7d is a bottom view of the present invention in the unloading position with the unloading conveyor extended.

The hopper 20 has a lower floor 22 and a plurality of sidewalls 24 extending upwardly from the lower floor 22 defining an interior cavity that receives the field crop 14 as illustrated in FIGS. 1 through 3 of the drawings. The hopper 20 preferably has an elongated rectangular shape structure having a longitudinal axis extending from a rear end to a front end of the hopper 20 as illustrated in FIG. 7a of the drawings. The longitudinal axis of the hopper 20 is preferably parallel to the longitudinal axis of the support frame 40. The length and width of the hopper 20 are also preferably similar to the length and width of the support frame 40.

An upper opening is defined by an upper edge of the plurality of sidewalls 24. The upper opening receives the field crop 14 from the harvester as the present invention is pulled alongside a harvester in the field.

An unloading door 28 is movably connected to an unloading end of the hopper 20 for allowing selective unloading of the field crop 14 in the hopper 20. One or more unloading actuators 29 are connected to the sidewalls 24 of the hopper 20 and the unloading door 28 to move the unloading door 28 into a closed position (FIG. 1) or an open position (FIG. 2). The unloading actuators 29 are preferably hydraulic actuators controlled by the tractor, however, the unloading actuators 29 may be electro-mechanical actuators. The unloading door 28 is preferably pivotally attached at an upper end thereof to or near the upper edge of the sidewalls 24 as shown in FIGS. 1 through 3 of the drawings. The unloading door 28 is preferably positioned at the front end of the hopper 20 but may alternatively be positioned at the rear end of the hopper 20.

A floor conveyor 30 is movably positioned with respect to the lower floor 22 to move the field crop 14 in the hopper 20. A drive motor moves the floor conveyor 30 so the upper run of the floor conveyor 30 that is adjacent the upper surface of the floor moves the field crop 14 in a first direction towards the opening exposed by the unloading door 28 when the unloading door 28 is opened. The drive motor is preferably comprised of a hydraulic motor that is fluidly connected to the tractor pulling the present invention and with the speed of the floor conveyor 30 adjustably controlled from the tractor. The faster the floor conveyor 30 moves a corresponding increase in the volume of field crop 14 discharged to the unloading conveyor 60 occurs and vice versa.

The lower run of the floor conveyor 30 that extends beneath the lower floor 22 moves in a second direction opposite of the first direction and away from the opening exposed by the unloading door 28. The floor conveyor 30 is preferably comprised of a bar-type conveyor having a plurality of cross members 34 (with or without one piece rubber or flapped attachments) attached to chains 32 that extend transverse with respect to a movement path of the floor conveyor 30 as illustrated in FIGS. 1 through 3 of the drawings. However, the floor conveyor 30 may be comprised of various other types of conveyors.

Figure 6:
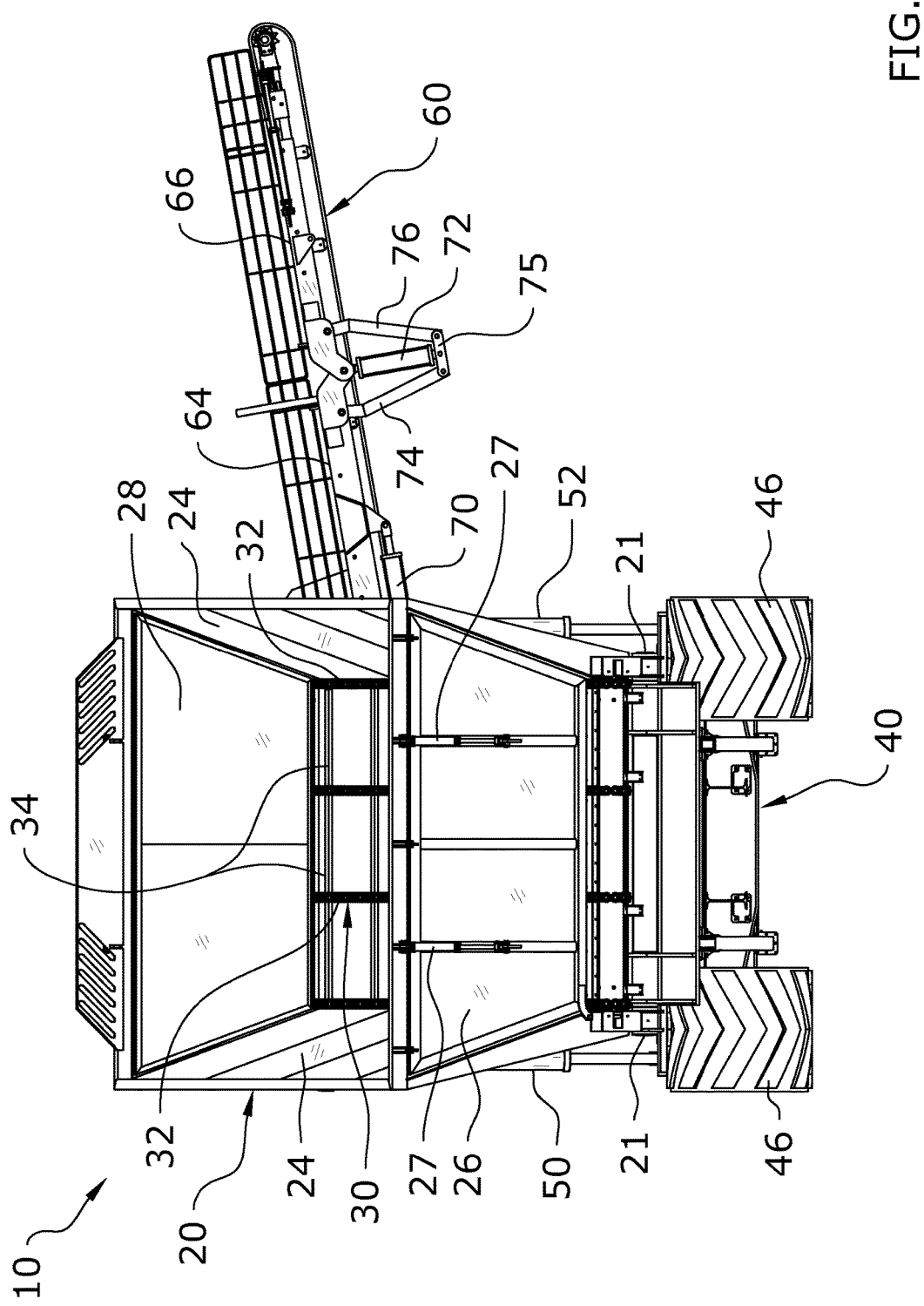
FIG. 6 is a rear view of the present invention in the unloading position.

The hopper 20 is pivotally connected to the support frame 40 to allow the unloading end to be lifted upwardly to the unloading position (FIG. 2) and lowered downwardly to the loading position (FIG. 1). The hopper 20 may be pivotally connected near the front end or the rear end of the support frame 40. However, it is preferable that the hopper 20 is pivotally connected to the support frame 40 at or near the rear end of the support frame 40 with the unloading end of the hopper 20 being located in the front as illustrated in FIGS. 1 through 3 of the drawings. The unloading end of the hopper 20 is preferably near the front end of the support frame 40. The hopper 20 is pivotally connected to the support frame 40 by one or more hinges 21 connected to or near the rear end of the support frame 40 and to the rear portion of the hopper 20 as best illustrated in FIG. 6 of the drawings.

The lower floor 22 of the hopper 20 is preferably substantially horizontal when the hopper 20 is in the loading position as illustrated in FIGS. 1, 4, 8a and 8b of the drawings. The lower floor 22 is preferably comprised of a flat and level planar structure to allow the floor conveyor 30 to move along the upper surface of the lower floor 22. The lower floor 22 of the hopper 20 is angled upwardly, preferably between 10 and 15 degrees towards the unloading end when the hopper 20 is in the unloading position. When the unloading end of the hopper 20 is at the front end, the lower floor 22 of the hopper 20 is angled upwardly, again at 10 to 15 degrees from the rear end of the hopper 20 to the front end of the hopper 20 as illustrated in FIGS. 2 and 3 of the drawings.

The hopper 20 may also include a second door opposite of the unloading door 28 as illustrated in FIGS. 1 through 3 of the drawings. The figures illustrate a rear door 26 opened and closed by one or more corresponding rear actuators 27. However, if the unloading door 28 is located in the rear portion of the hopper 20 then the second door would be located at the front portion of the hopper 20. The rear door 26 may be used to unload a field crop 14 or other particulate material from the hopper 20 opposite of the unloading conveyor 60 by simply lifting the front end of the hopper 20 without moving the floor conveyor 30.

D. Actuators.

One or more actuators 50, 52 are connected between the support frame 40 and the hopper 20. It is preferable to have at least a first actuator 50 and a second actuator 52 connected to opposing side portions of the support frame 40 and the hopper 20 as illustrated in FIGS. 2 and 3 of the drawings. However a single actuator 50, 52 may be used to lift and lower the hopper 20 between the loading position and the unloading position. The actuators 50, 52 are preferably comprised of hydraulic actuators that are fluidly connected to the hydraulic system of the tractor, however, the actuators 50, 52 may be comprised of electro-mechanical actuators.

The actuators 50, 52 are adapted to lift the unloading end of the hopper 20 from a loading position into an unloading position. The loading position for the hopper 20 is for receiving the field crop 14 into the hopper 20 and the unloading position for the hopper 20 is for unloading the field crop 14 from the hopper 20.

The unloading end of the hopper 20 is preferably the front end of the hopper 20 with the unloading door 28 movably connected to the front end of the hopper 20 also to unload the field crop 14 from the front end of the hopper 20 when the front end of the hopper 20 is elevated at 10 to 15 degrees. The actuators 50, 52 are preferably connected to a front portion of the hopper 20 to lift the front end of the hopper 20 and the unloading conveyor 60 upwardly as illustrated in FIGS. 2 and 3 of the drawings.

E. Unloading Conveyor.

The unloading conveyor 60 is attached to the unloading end of the hopper 20 and is adapted to receive and discharge a field crop 14 received from the hopper 20 when in the unloading position. The unloading conveyor 60 is preferably comprised of a bar-type conveyor belt having a plurality of cross bars and a plurality of slots, however, the unloading conveyor 60 may be comprised of various other types of conveyors.

A drive motor moves the unloading conveyor 60 so the upper run of the unloading conveyor 60 moves the field crop 14 in a first direction towards the discharge end of the unloading conveyor 60. The drive motor is preferably comprised of a hydraulic motor that is fluidly connected to the tractor pulling the present invention and with the speed of the unloading conveyor 60 adjustably controlled from the tractor. The faster the unloading conveyor 60 moves a corresponding increase in the volume of field crop 14 discharged to the unloading conveyor 60 occurs and vice versa.

The unloading conveyor 60 has an upper run that moves the field crop 14 to the discharge end of the unloading conveyor 60 to discharge the field crop 14 into a different vehicle or location. The unloading conveyor 60 also has a lower run that provides a return for the unloading conveyor 60. The longitudinal axis of the unloading conveyor 60 is preferably substantially transverse with respect to the longitudinal axis of the lower floor 22 of the hopper 20. The proximal end of the unloading conveyor 60 is preferably near one of the sidewalls 24 of the hopper 20 and the distal end of the unloading conveyor 60 extends outwardly away from an opposite sidewall 24 to discharge the field crop 14 at an elevated height to a transport vehicle 12 as illustrated in FIG. 5e of the drawings.

Figure 8A:
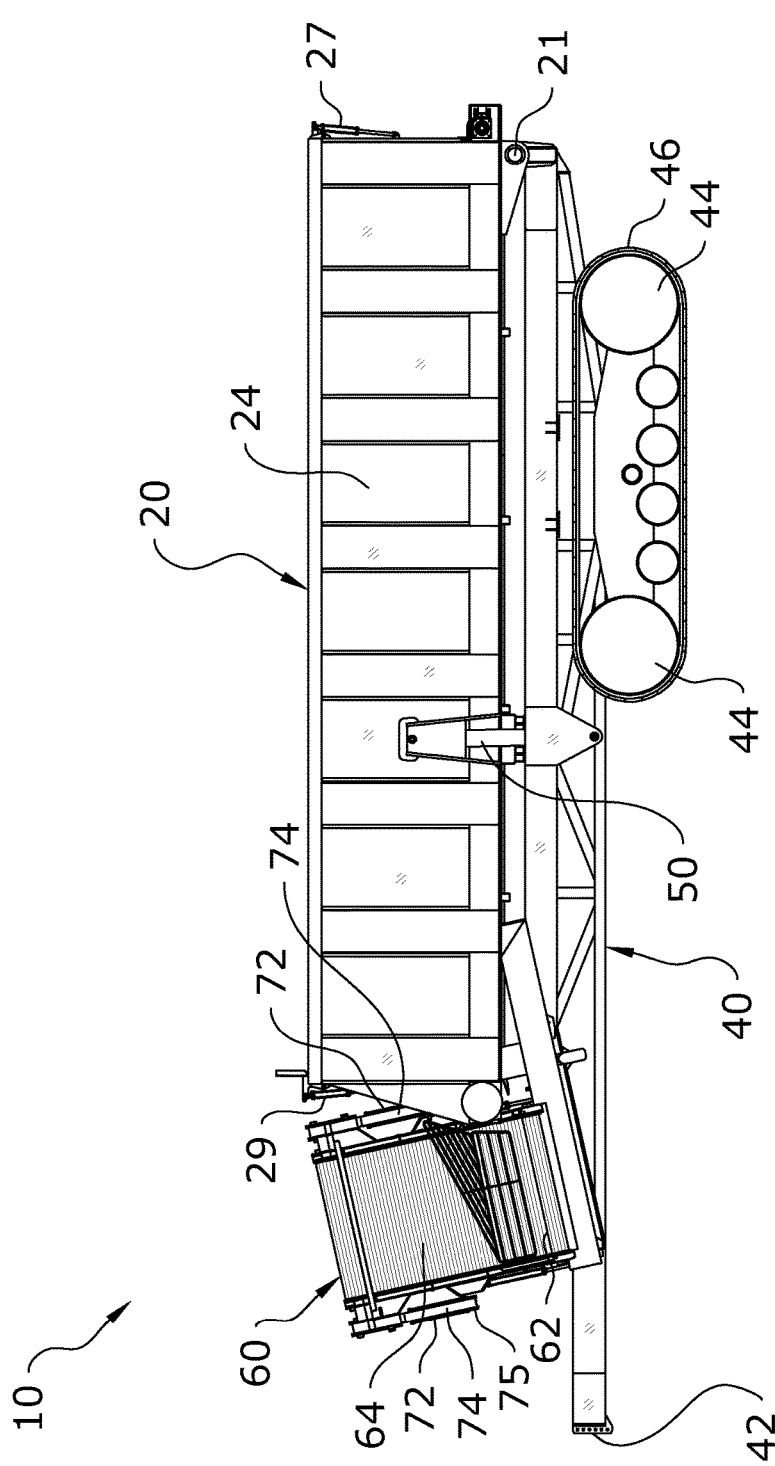
FIG. 8a is a left side view of the present invention in the loading position.
Figure 8B:
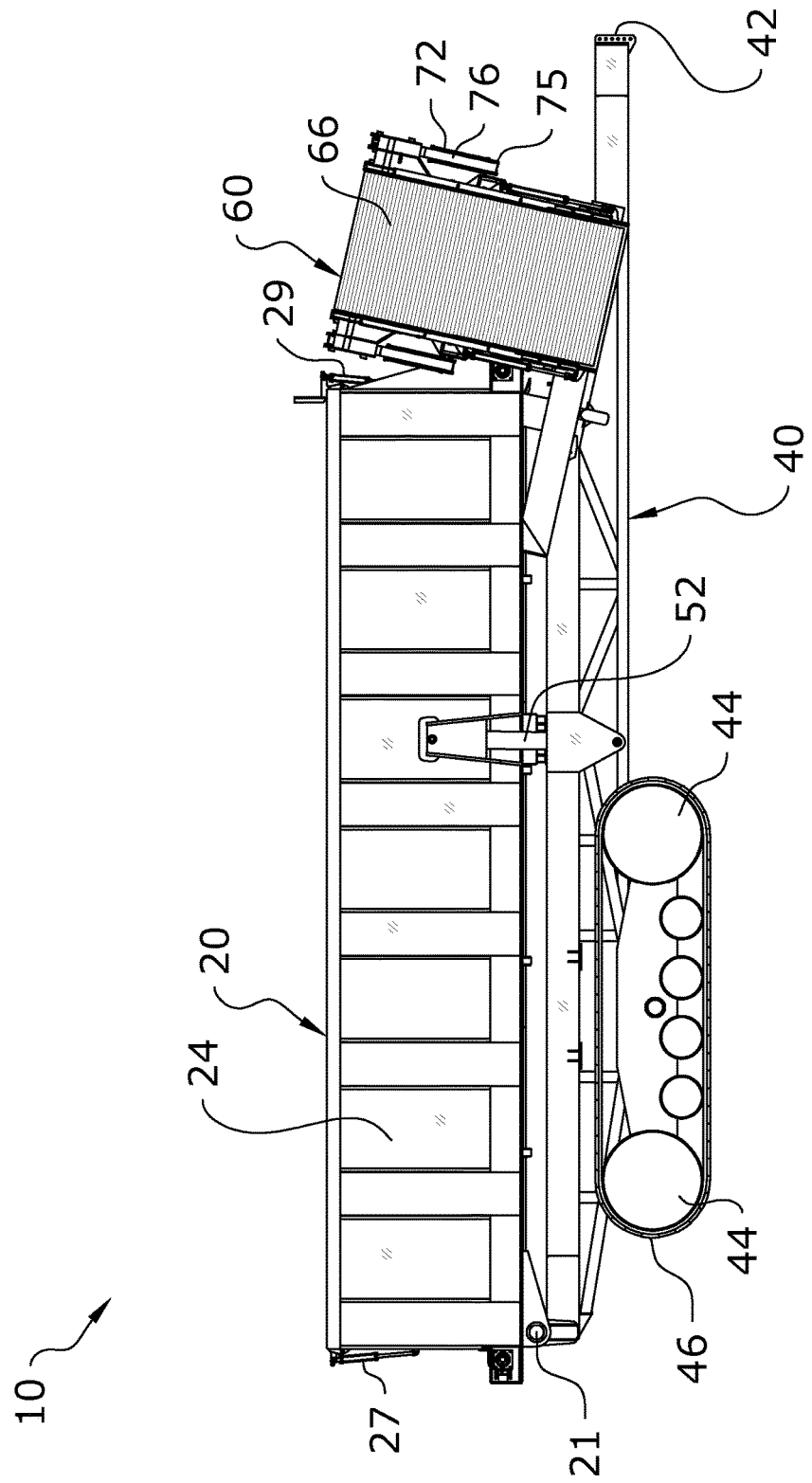
FIG. 8b is a right side view of the present invention in the loading position.
Figure 8C:
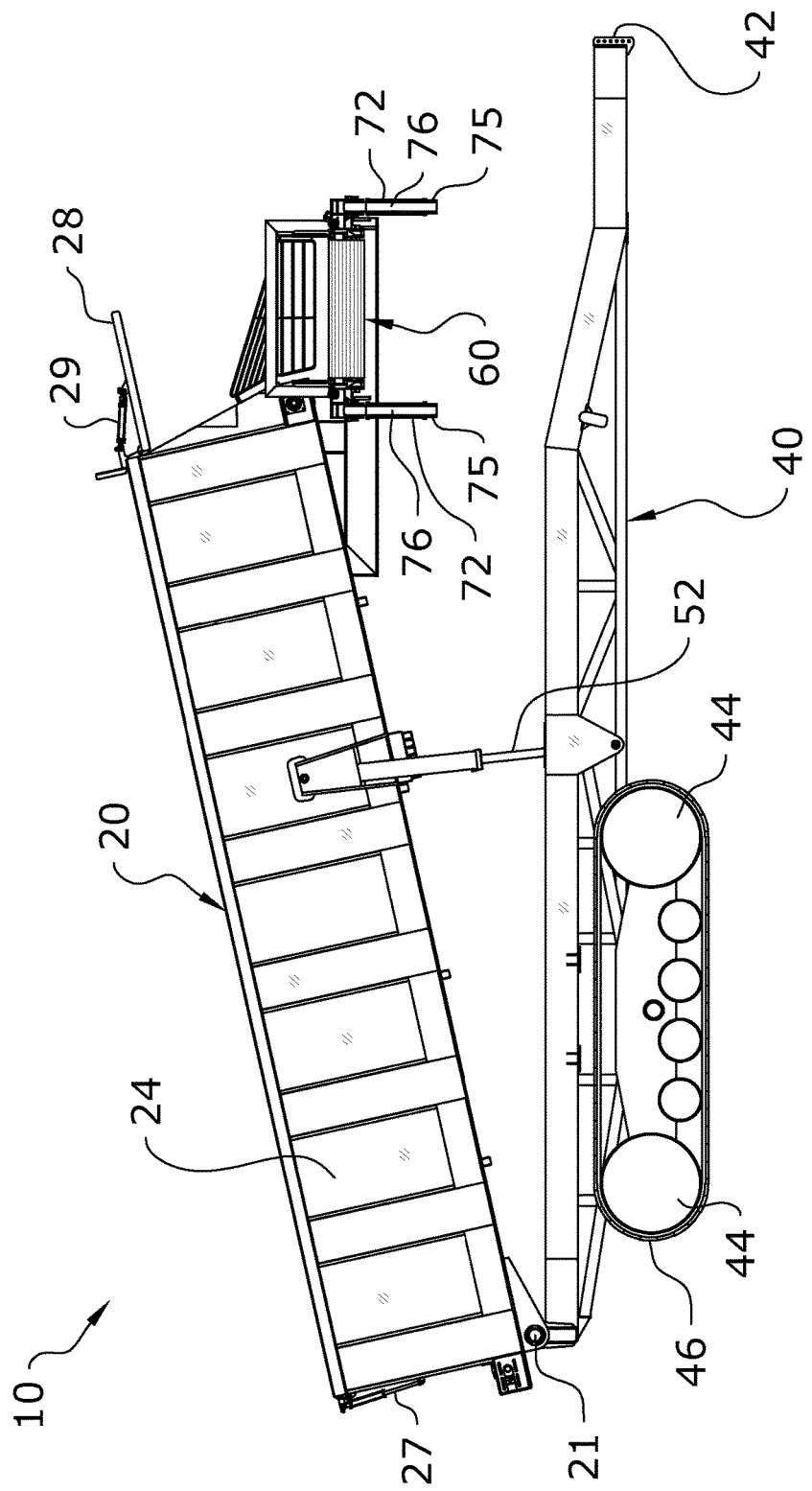
FIG. 8c is a right side view of the present invention in the unloading position.

The unloading conveyor 60 is downwardly angled from a rear edge to a front edge of the unloading conveyor 60 when the hopper 20 is in the loading position as best illustrated in FIG. 8b of the drawings. The unloading conveyor 60 is substantially horizontal from the rear edge to the front edge of the unloading conveyor 60 when the hopper 20 is in the unloading position as illustrated in FIG. 8c of the drawings. The angle of the unloading conveyor 60 with respect to the front end of the hopper 20 corresponds to the change in angle when the hopper 20 is elevated from the loading position to the unloading position so the unloading conveyor 60 is substantially level when unloading the field crop 14 as illustrated in FIG. 8c of the drawings.

Figure 4:
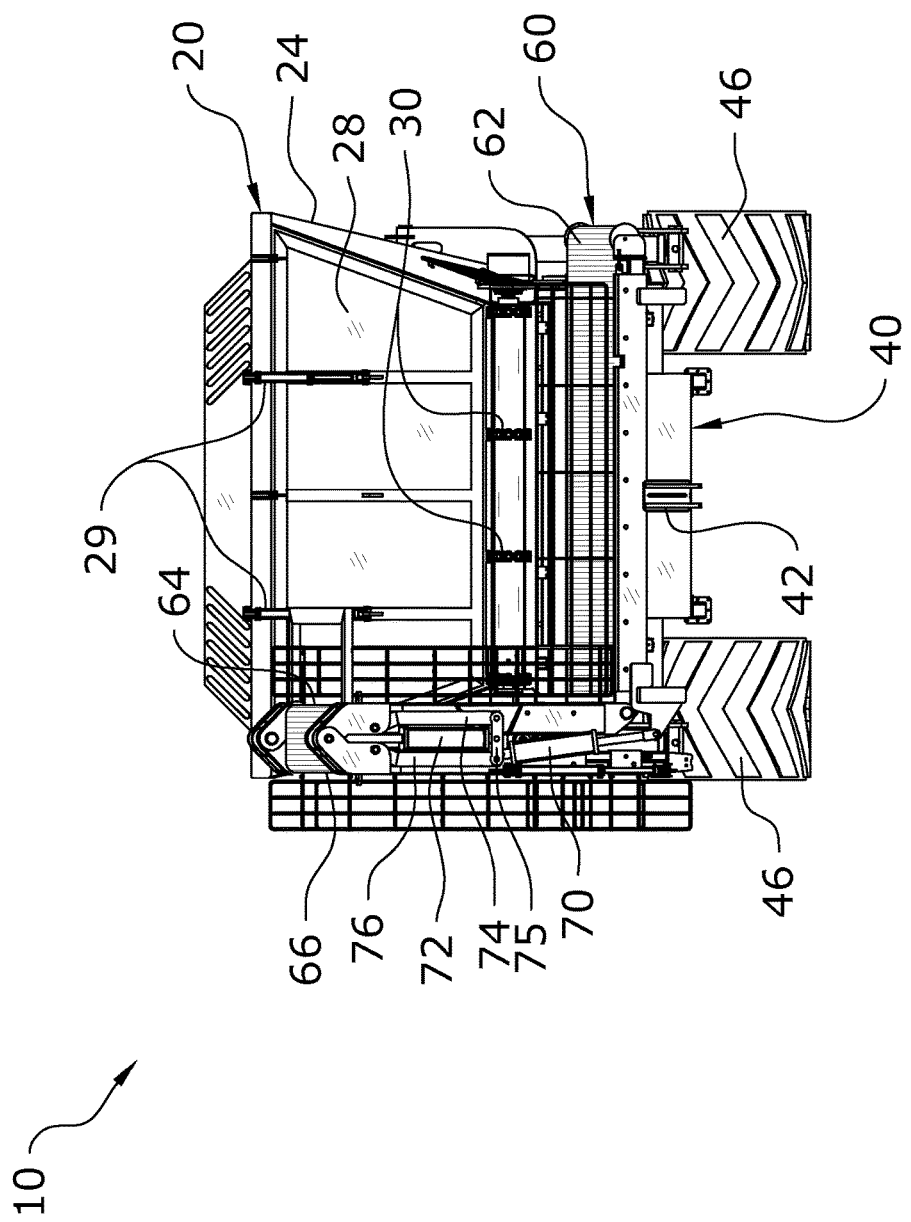
FIG. 4 is a front view of the present invention in the loading position.

The unloading conveyor 60 is comprised of an elongated structure having a longitudinal axis extending from a proximal end to a distal end. The unloading conveyor 60 is adapted to be horizontal from the proximal end to the distal end when the hopper 20 is in the unloading position as illustrated in FIG. 5e of the drawings. The longitudinal axis of the unloading conveyor 60 is preferably substantially transverse with respect to a longitudinal axis of the hopper 20. An upper end of the unloading conveyor 60 is positioned at or below the upper edge of the plurality of side walls when the hopper 20 is in the loading position to reduce the chance of engagement with the crop harvester or other equipment as best illustrated in FIG. 4 of the drawings.

Figure 5A:
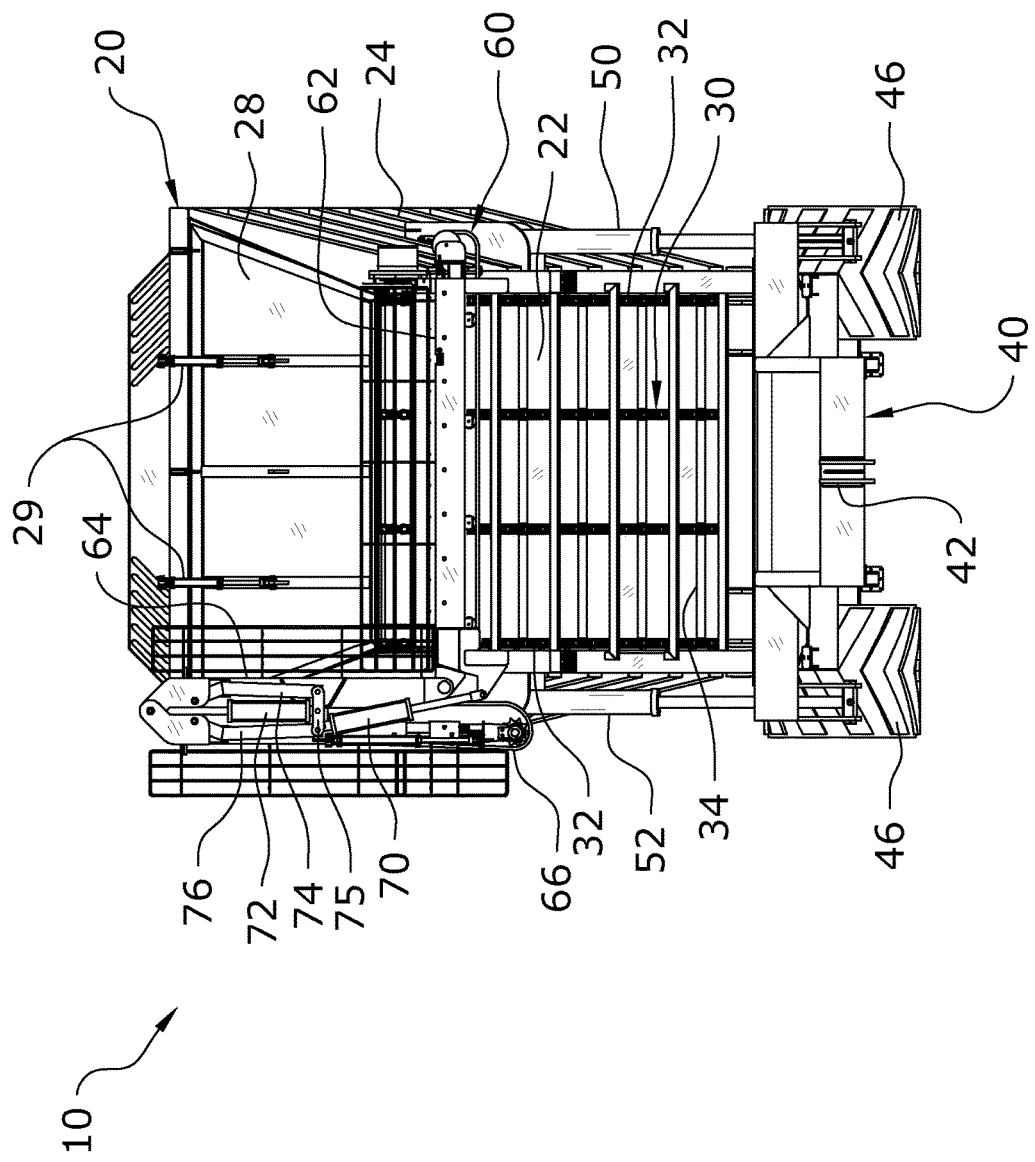
FIG. 5a is a front view with the front end of the hopper elevated.
Figure 5B:
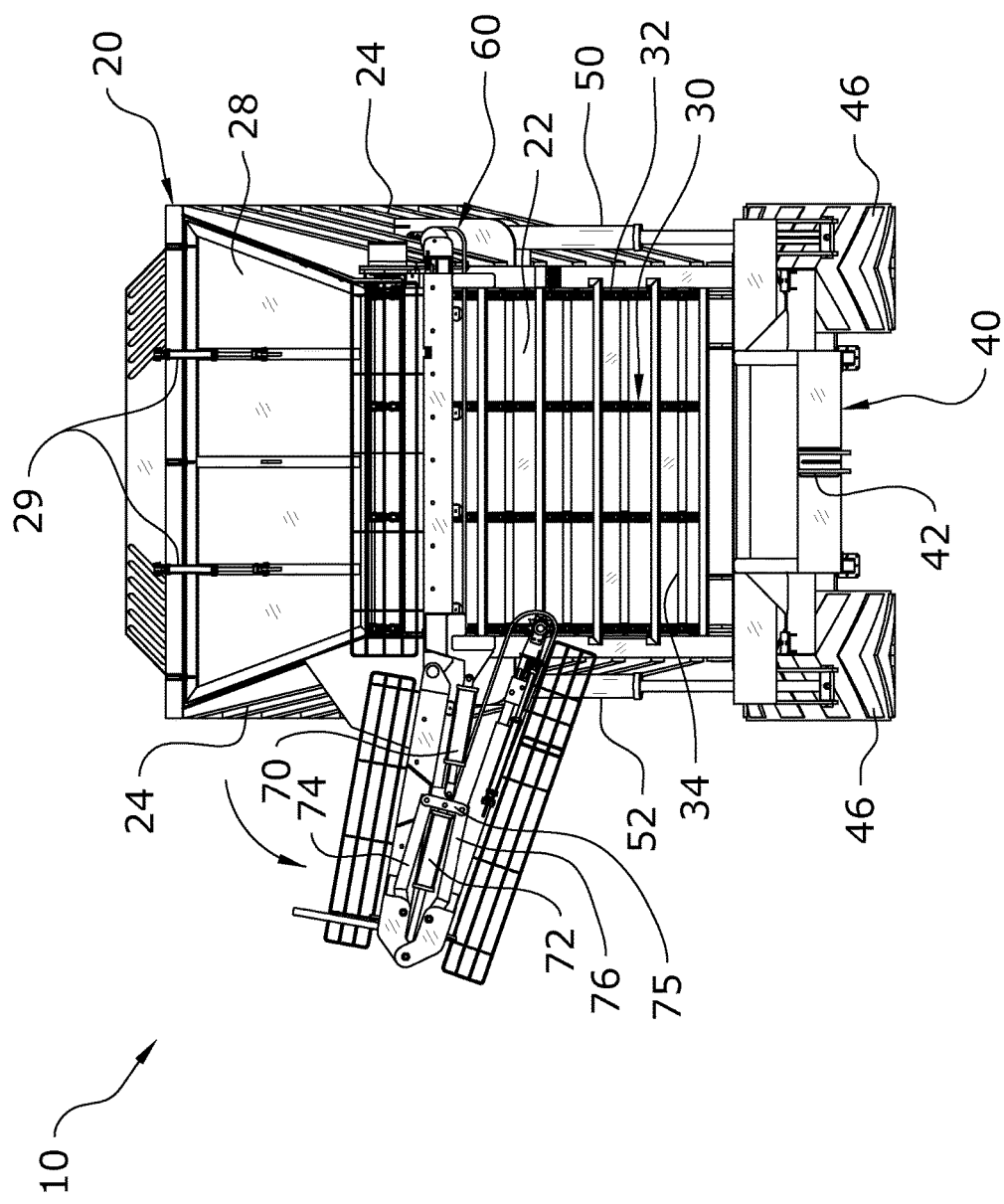
FIG. 5b is a front view with the unloading conveyor partially extended.
Figure 5C:
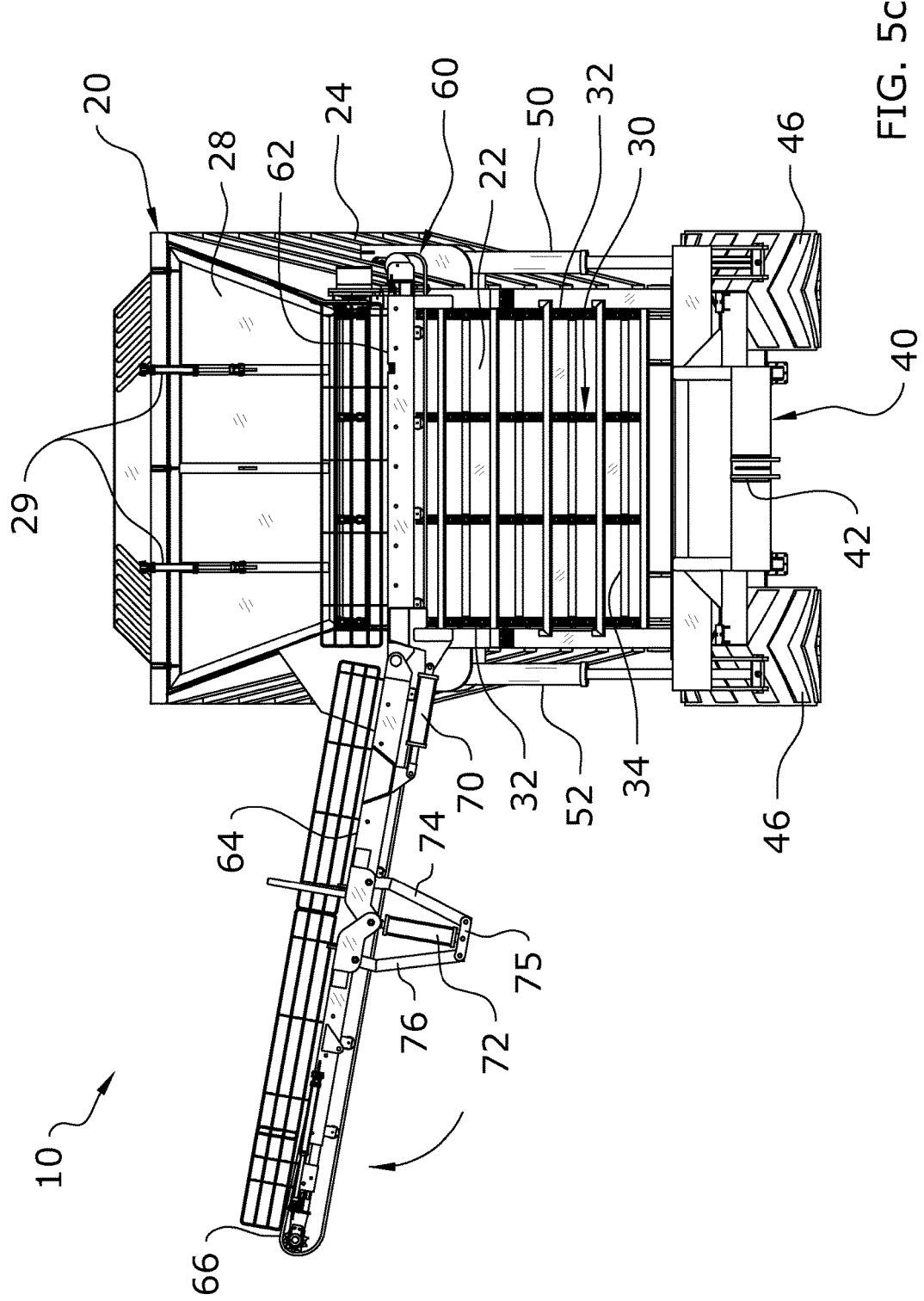
FIG. 5c is a front view with the unloading conveyor fully extended at a slight upward angle.
Figure 5D:
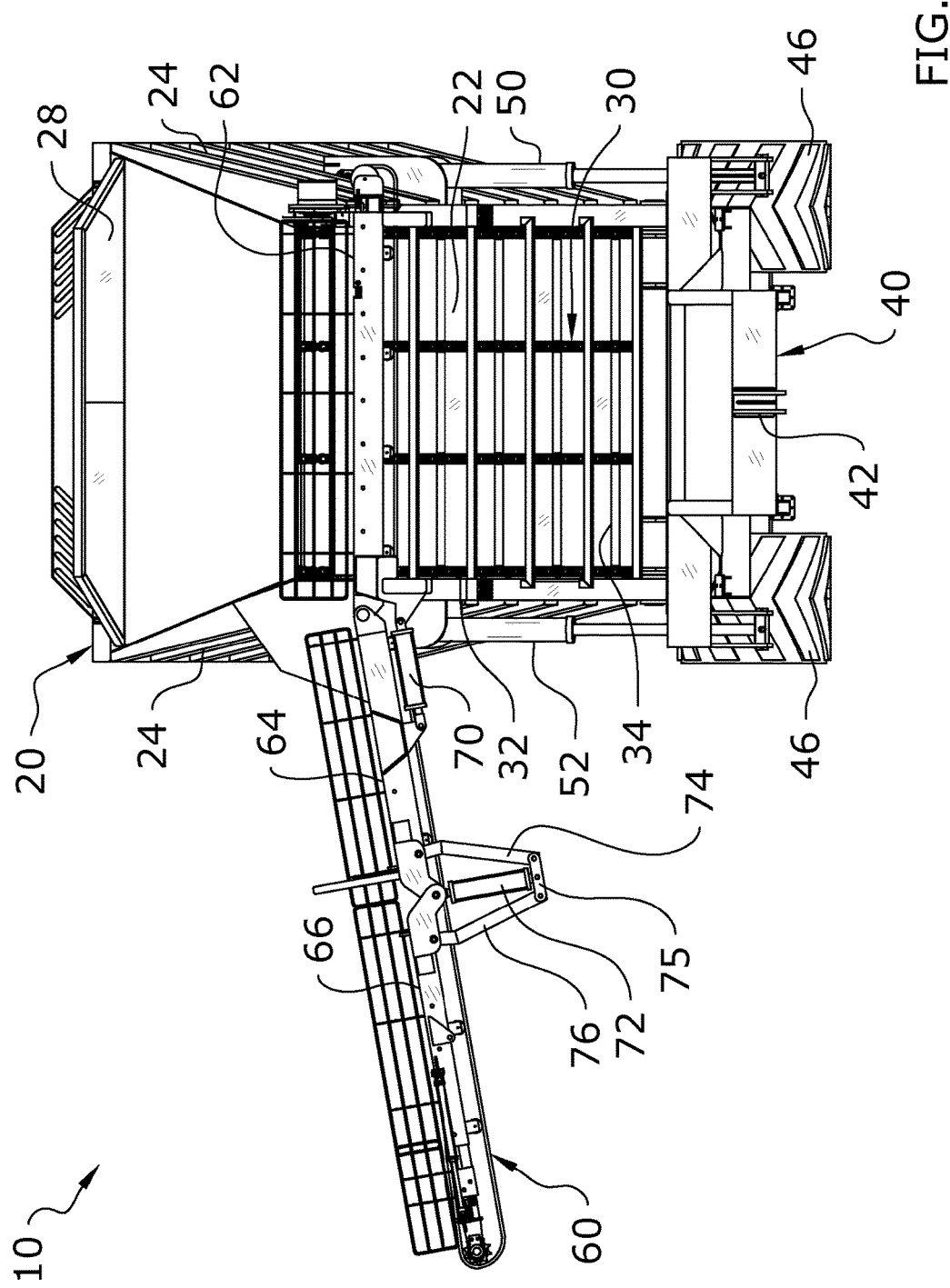
FIG. 5d is a front view with the unloading conveyor fully extended at a slight downward angle.
Figure 5E:
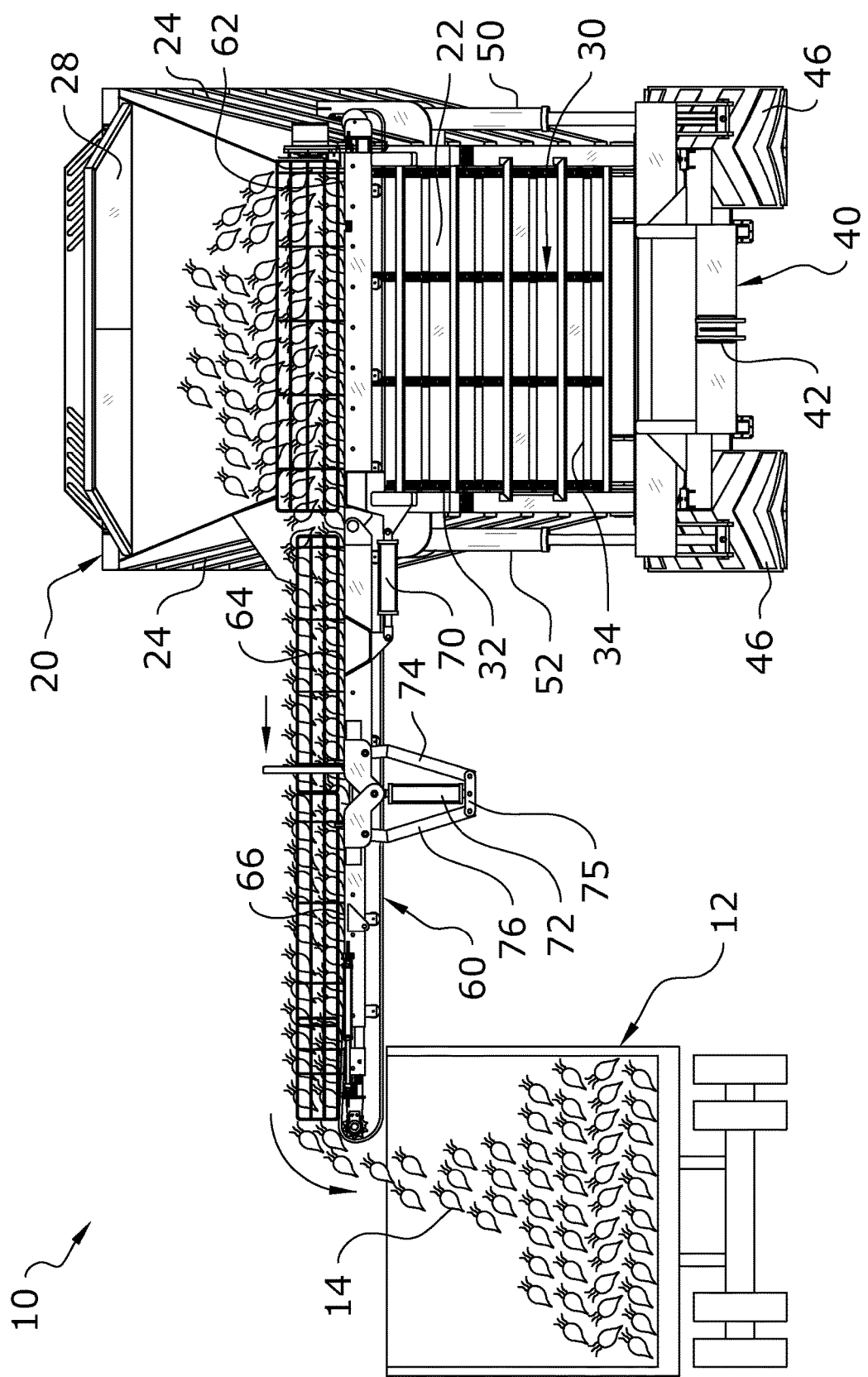
FIG. 5e is a front view with the unloading conveyor fully extended in a substantially horizontal manner unloading a field crop.

The unloading conveyor 60 is preferably comprised of a folding conveyor as illustrated in FIGS. 5a through 56e of the drawings. The unloading conveyor 60 is comprised of a first segment 62 attached to the unloading end of the hopper 20, a second segment 64 pivotally connected to a distal end of the first segment 62 and a third segment 66 pivotally connected to a distal end of the second segment 64 as best illustrated in FIGS. 5a through 5e of the drawings. The first segment 62 has a first frame, the second segment 64 has a second frame and the third segment 66 has a third frame that are independent movable with respect to one another in a pivotal manner. The first frame of the first segment 62 is preferably non-movably attached to the front end of the hopper 20 such that the upper surface of the unloading conveyor 60 is at or below the upper surface of the lower floor 22 of the hopper 20 to receive the field crop 14.

One or more inner actuators 70 are connected between the first segment 62 and the second segment 64 of the unloading conveyor 60 to extend and retract the second segment 64 with respect to the first segment 62 as illustrated in FIGS. 5a through 5e of the drawings. One or more outer actuators 72 are connected between the second segment 64 and the third segment 66 of the unloading conveyor 60 to extend and retract the third segment 66 with respect to the second segment 64 as illustrated in FIGS. 5a through 5e of the drawings.

One or more pivot frame structures pivotally support the pivot connection between the second segment 64 and the third segment 66. The pivot frame structures are each comprised of a first arm 74 pivotally connected to the second segment 64, a second arm 76 pivotally connected to the third segment 66, and a connecting member 75 pivotally connected between the arms 74, 76 as best illustrated in FIGS. 5c through 5e of the drawings. The outer actuators 72 are connected between the connecting member 75 and the pivot joint between the second segment 64 and the third segment 66 as further shown in FIGS. 5c through 5e of the drawings.

F. Operation of Preferred Embodiment.

In use, the user connects a tractor to the hitch 42 of the support frame 40 and fluidly connects all of the actuators and drive motors to the hydraulic system of the tractor. Pulling the present invention alongside a harvester with the hopper in the lowered loading position (FIG. 1), the harvester fills the hopper 20 with the field crop 14 such as sugar beets. When the hopper 20 is full, the user pulls the present invention to an unloading location to unload the field crop 14 to a transport vehicle 12 to be transported to a desired location (e.g. a processing facility). The user first lifts the front end of the hopper 20 using the actuators 50, 52 as illustrated in FIG. 5a. Once the hopper 20 is fully elevated to the unloading height, the user then extends the unloading conveyor 60 outwardly to the extended position as illustrated in FIGS. 5b through 5d of the drawings. The user then pulls forwardly alongside the transport vehicle 12 until the discharge end of the unloading conveyor 60 is aligned with the desired unloading location in the box of the transport vehicle 12 as illustrated in FIG. 5e. The user then opens the unloading door 28 and then activates both the floor conveyor 30 and the unloading conveyor 60 to move the field crop 14 from the hopper 20 to the unloading conveyor 60 and then into the box of the transport vehicle 12. Because the unloading conveyor 60 is horizontal or substantially horizontal during unloading, the field crop 14 does not roll back and less hydraulic fluid is required to move the field crop 14 during unloading. Once the hopper 20 and unloading conveyor 60 are empty, the transport vehicle 12 pulls forwardly and away from the present invention. The user then lowers the hopper 20 to the loading position and retracts the unloading conveyor 60 as illustrated in FIG. 4 of the drawings. The above process is repeated as necessary.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A crop cart for receiving, transporting and unloading a harvested crop, comprising:
 a support frame having a front end, a rear end and a plurality of wheels rotatably attached to said support frame for movably supporting said support frame above a ground surface;
 a hopper having a lower floor, a floor conveyor movably positioned with respect to said lower floor, a plurality of sidewalls extending upwardly from said lower floor, an unloading door movably connected to an unloading end of said hopper, and an upper opening defined by an upper edge of said plurality of sidewalls for receiving a field crop, wherein said hopper is pivotally connected to said support frame;
 a first actuator connected between said support frame and said hopper, wherein said first actuator is adapted to lift said unloading end of said hopper from a loading position into an unloading position, wherein said loading position for said hopper is for receiving the field crop into the hopper and said unloading position for said hopper is for unloading the field crop from said hopper; and
 an unloading conveyor having opposite inner and outer edges, the unloading conveyor attached at said inner edge; to said unloading end of said hopper, wherein said unloading conveyor is adapted to receive and discharge a field crop from said hopper, wherein said unloading conveyor is downwardly angled from said inner edge to said outer edge of said unloading conveyor when said hopper is in said loading position, and wherein said unloading conveyor is substantially horizontal from said inner edge to said outer edge of said unloading conveyor when said hopper is in said unloading position.

2. The crop cart of claim 1, including a first track surrounding a plurality of wheels on a first side of said support frame and a second track surrounding a plurality of wheels on a second side of said support frame.

3. The crop cart of claim 1, wherein said support frame includes a hitch adapted for removably connecting to a tractor.

4. The crop cart of claim 1, wherein said hopper is pivotally connected near said front end or said rear end of said support frame.

5. The crop cart of claim 1, wherein said hopper is pivotally connected to said support frame by a hinge.

6. The crop cart of claim 5, wherein said hinge is connected to or near said rear end of said support frame and to a rear portion of said hopper.

7. The crop cart of claim 6, wherein said first actuator is connected to a front portion of said hopper.

8. The crop cart of claim 7, wherein said unloading end of said hopper is near said front end of said support frame.

9. The crop cart of claim 1, wherein said lower floor of said hopper is substantially horizontal when said hopper is in said loading position.

10. The crop cart of claim 1, wherein said lower floor of said hopper is angled upwardly towards said unloading end between 10 to 15 degrees when said hopper is in said unloading position.

11. The crop cart of claim 1, wherein said unloading conveyor is comprised of an elongated structure having a longitudinal axis extending from a proximal end to a distal end, wherein said unloading conveyor is adapted to be horizontal from said proximal end to said distal end when said hopper is in said unloading position.

12. The crop cart of claim 11, wherein said longitudinal axis of said unloading conveyor is substantially transverse with respect to a longitudinal axis of said hopper.

13. The crop cart of claim 1, wherein said unloading conveyor is comprised of a folding conveyor, wherein an upper end of said unloading conveyor is positioned at or below said upper edge of said plurality of side walls when said hopper is in said loading position.

14. The crop cart of claim 13, wherein said unloading conveyor is comprised of a first segment attached to said unloading end of said hopper, a second segment pivotally connected to a distal end of said first segment and a third segment pivotally connected to a distal end of said second segment.

15. The crop cart of claim 1, including an unloading actuator connected to said hopper and said unloading door to move said unloading door into a closed position or an open position.

16. The crop cart of claim 15, wherein said unloading door is pivotally attached to or near said upper edge of said sidewalls.

17. The crop cart of claim 1, wherein said floor conveyor is comprised of a bar-type conveyor.

18. A crop cart for receiving, transporting and unloading a harvested crop, comprising:
 a support frame having a front end, a rear end, a plurality of wheels rotatably attached to said support frame for movably supporting said support frame above a ground surface and a hitch adapted for removably connecting to a tractor;
 a hopper having a lower floor, a floor conveyor movably positioned with respect to said lower floor, a plurality of sidewalls extending upwardly from said lower floor, an unloading door movably connected to an unloading end of said hopper, and an upper opening defined by an upper edge of said plurality of sidewalls for receiving a field crop, wherein said hopper is pivotally connected to said support frame and wherein said unloading end of said hopper is near said front end of said support frame;
 a first actuator connected between said support frame and said hopper, wherein said first actuator is adapted to lift said unloading end of said hopper from a loading position into an unloading position, wherein said loading position for said hopper is for receiving the field crop into the hopper and said unloading position for said hopper is for unloading the field crop from said hopper, and wherein said lower floor of said hopper is substantially horizontal when said hopper is in said loading position; and
 an unloading conveyor having opposite inner and outer edges, the unloading conveyor attached at said inner edge; to said unloading end of said hopper, wherein said unloading conveyor is adapted to receive and discharge a field crop from said hopper, wherein said unloading conveyor is downwardly angled from said inner edge to said outer edge of said unloading conveyor when said hopper is in said loading position, and wherein said unloading conveyor is substantially horizontal from said inner edge to said outer edge of said unloading conveyor when said hopper is in said unloading position.

19. A crop cart for receiving, transporting and unloading a harvested crop, comprising:
 a support frame having a front end, a rear end, a plurality of wheels rotatably attached to said support frame for movably supporting said support frame above a ground surface and a hitch adapted for removably connecting to a tractor;
 a hopper having a lower floor, a floor conveyor movably positioned with respect to said lower floor, a plurality of sidewalls extending upwardly from said lower floor, an unloading door movably connected to an unloading end of said hopper, and an upper opening defined by an upper edge of said plurality of sidewalls for receiving a field crop, wherein said hopper is pivotally connected to said support frame, wherein said unloading end of said hopper is near said front end of said support frame, wherein said hopper is pivotally connected to said support frame by a hinge, wherein said hinge is connected to or near said rear end of said support frame and to a rear portion of said hopper;
 a first actuator connected between said support frame and said hopper, wherein said first actuator is adapted to lift said unloading end of said hopper from a loading position into an unloading position, wherein said loading position for said hopper is for receiving the field crop into the hopper and said unloading position for said hopper is for unloading the field crop from said hopper, wherein said first actuator is connected to a front portion of said hopper, and wherein said lower floor of said hopper is substantially horizontal when said hopper is in said loading position; and
 an unloading conveyor having opposite inner and outer edges, the unloading conveyor attached at said inner edge; to said unloading end of said hopper, wherein said unloading conveyor is adapted to receive and discharge a field crop from said hopper, wherein said unloading conveyor is downwardly angled from said inner edge to said outer edge of said unloading conveyor when said hopper is in said loading position, and wherein said unloading conveyor is substantially horizontal from said inner edge to said outer edge of said unloading conveyor when said hopper is in said unloading position.

20. The crop cart of claim 19, wherein said unloading conveyor is comprised of a folding conveyor, wherein an upper end of said unloading conveyor is positioned at or below said upper edge of said plurality of side walls when said hopper is in said loading position.

21. The crop cart of claim 20, wherein said unloading conveyor is comprised of a first segment attached to said unloading end of said hopper, a second segment pivotally connected to a distal end of said first segment and a third segment pivotally connected to a distal end of said second segment.

22. The crop cart of claim 19, including an unloading actuator connected to said hopper and said unloading door to move said unloading door into a closed position or an open position.

23. The crop cart of claim 22, wherein said unloading door is pivotally attached to or near said upper edge of said sidewalls.

* * * * *